(12) United States Patent
Greene

(10) Patent No.: US 6,775,787 B2
(45) Date of Patent: Aug. 10, 2004

(54) INSTRUCTION SCHEDULING BASED ON POWER ESTIMATION

(75) Inventor: Michael A. Greene, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 231 days.

(21) Appl. No.: 10/038,853

(22) Filed: Jan. 2, 2002

(65) Prior Publication Data

US 2003/0126476 A1 Jul. 3, 2003

(51) Int. Cl.[7] .............................................. G06F 11/30
(52) U.S. Cl. ............................................................ 713/340
(58) Field of Search ................................. 713/300, 320, 713/322, 340; 709/100

(56) References Cited

U.S. PATENT DOCUMENTS

| | | | | |
|---|---|---|---|---|
| 5,787,297 A | * | 7/1998 | Lin .............................. | 713/322 |
| 5,941,991 A | * | 8/1999 | Kageshima .................. | 713/340 |
| 5,991,884 A | | 11/1999 | Lin et al. | |
| 6,002,878 A | * | 12/1999 | Gehman et al. ............ | 713/340 |
| 6,055,640 A | * | 4/2000 | Kageshima et al. ........ | 713/320 |
| 6,096,089 A | | 8/2000 | Kageshima | |
| 6,167,524 A | * | 12/2000 | Goodnow et al. .......... | 713/300 |
| 6,205,555 B1 | * | 3/2001 | Kageshima et al. ........ | 713/300 |
| 6,513,124 B1 | * | 1/2003 | Furuichi et al. ............ | 713/322 |

FOREIGN PATENT DOCUMENTS

JP    08101777 A  *  4/1996  ............. G06F/9/45

OTHER PUBLICATIONS

Tomiyama et al, Instruction Scheduling for Power Reduction in Processor–Based System Design, IEEE 1998,.*

Tiwari/Malik/Wolfe, "Power Analysis of Embedded Software: A First Step Towards Software Power Minimization", aritcle published by Dept. of Electrical Engineering, Princeton University, 1994, pp. 384–390, Princeton N.J. USA.*

Lee/Tiwari/Malik/Fujita, "Power Analysis and Minimization Techniques for Embedded DSP Software", article published in IEE Transactions VSLI Systems, vol. 5, No. 1, pp. 123–135, Mar. 1997, USA.*

Search Report for PCT/US02/41815; mailed May 2, 2003; 2 pages.*

* cited by examiner

Primary Examiner—Dennis M. Butler
Assistant Examiner—Suresh K Suryawanshi
(74) Attorney, Agent, or Firm—Blakely, Sokoloff, Taylor & Zafman LLP

(57) ABSTRACT

In an embodiment, an apparatus includes a memory to include at least one power value associated with at least one instruction. The at least one power value indicating an amount of power required to execute the at least one associated instruction by the apparatus. The apparatus also includes an instruction scheduler to receive the at least one power value and the at least one instruction. The instruction scheduler is to schedule the at least one instruction for execution by at least one functional unit based on the at least one associated power value.

30 Claims, 4 Drawing Sheets

INSTRUCTION SCHEDULING BASED ON POWER ESTIMATION

FIELD OF THE INVENTION

The invention relates to electronic devices. More specifically, the invention relates to instruction scheduling for electronic devices based on power estimation.

BACKGROUND OF THE INVENTION

Traditional electronic devices, such as microprocessors, have scheduled execution of instructions therein, typically, based on hardware resources and data availability in order to maximize their performance. However, with the increase in power consumption due to process technology improvements, these microprocessors may draw more current than the voltage regulator for the microprocessor is capable of supplying. A typical approach to account for this overdrawing of current by these microprocessors includes thermal and digital throttling mechanisms wherein the stream of instructions into the microprocessor are halted through means of an instruction stall, thereby reducing the power being consumed by the microprocessors. Disadvantageously, halting the instruction stream being processed by the microprocessors reduces its performance.

Moreover, current spikes can be introduced into the hardware when the number of instructions being processed by the microprocessor widely vary. For example, if the microprocessor is processing a number of instructions from an instruction-intensive application, followed by a period of no instruction processing and returning to processing a number of instructions from another instruction-intensive application, the amount of current drawn by the microprocessor will vary accordingly.

BRIEF DESCRIPTION OF THE DRAWINGS

Embodiments of the invention may be best understood by referring to the following description and accompanying drawings that illustrate such embodiments. The numbering scheme for the Figures included herein are such that the leading number for a given element in a Figure is associated with the number of the Figure. For example, system 100 can be located in FIG. 1. However, element numbers are the same for those elements that are the same across different Figures.

In the drawings.

DETAILED DESCRIPTION

In the following description, for purposes of explanation, numerous specific details are set forth in order to provide a thorough understanding of the present invention. It will be evident, however, to one skilled in the art that the present invention may be practiced without these specific details.

Embodiments of the present invention account for the consumption of power by given instructions to be executed within electronic devices, such as microprocessors, when scheduling instructions for execution therein. In particular, embodiments of the present invention ensure that the requirements for minimum and maximum power consumption for given electronic devices are followed through instruction scheduling that is not only based on hardware resources and data availability but also power consumption for instructions that are executing and are to be executed.

Moreover, embodiments of the present invention can ensure that the change in current being consumed by an electronic device over time is within a safe range, thereby precluding abrupt changes in current and potentially spikes in current that could occur. Accordingly, embodiments of the present invention provide more time to gradually ramp up the current draw for a given electronic device. As will be described in more detail below, embodiments of the present invention can be employed to detect system inactivity and inject artificial instructions to prevent large current swings, thereby lowering packaging cost associated with these electronic devices.

Figure 1:
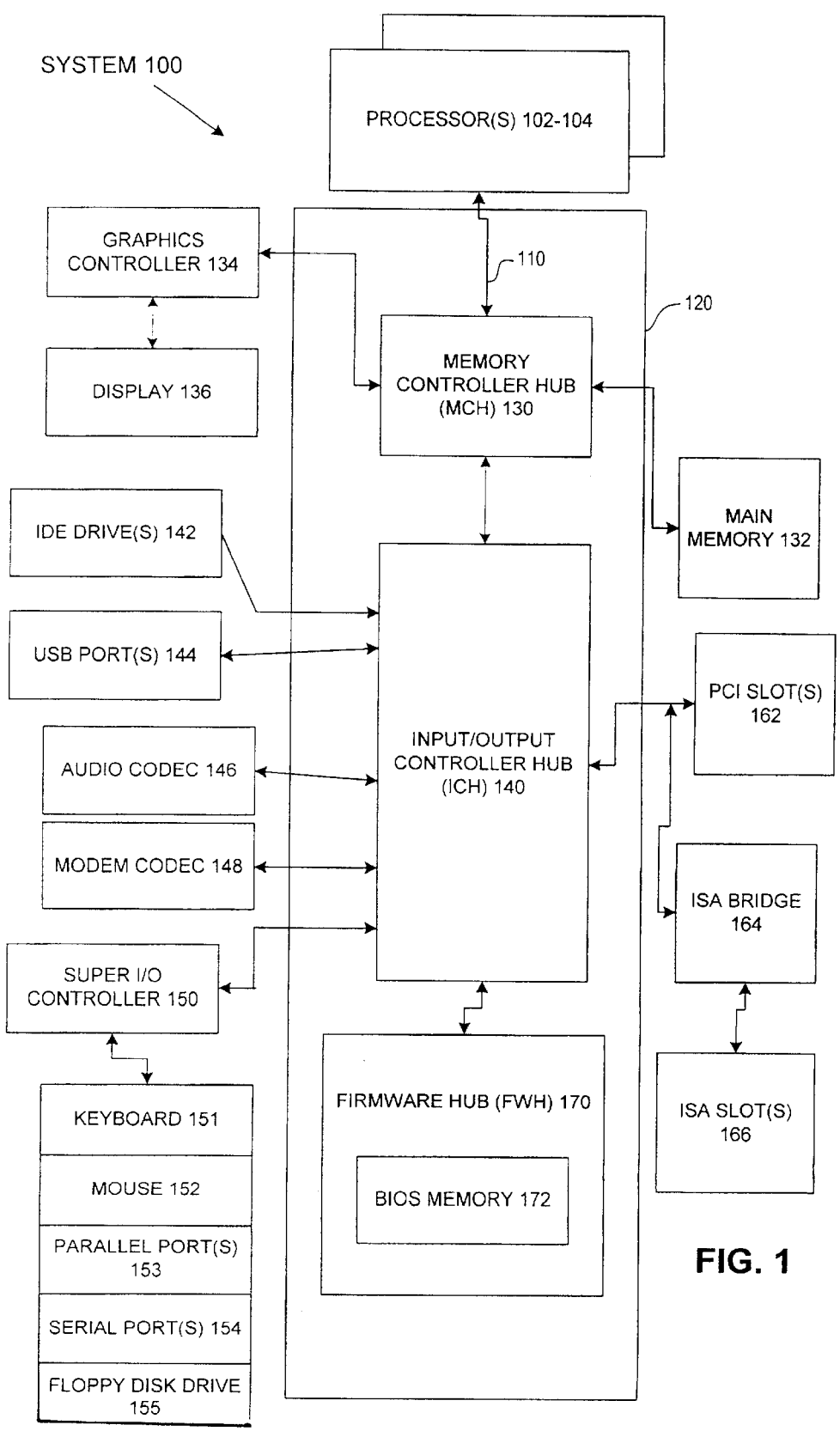
FIG. 1 illustrates an exemplary system 100 comprising processors 102 and 104 for controlling compatibility levels of binary translations between instruction set architectures, according to embodiments of the present invention.

FIG. 1 illustrates an exemplary system 100 comprising processors 102 and 104 for controlling compatibility levels of binary translations between instruction set architectures, according to embodiments of the present invention. Although described in the context of system 100, the present invention may be implemented in any suitable computer system comprising any suitable one or more integrated circuits.

As illustrated in FIG. 1, computer system 100 comprises processor 102 and processor 104. Computer system 100 also includes processor bus 110, and chipset 120. Processors 102 and 104 and chipset 120 are coupled to processor bus 110. Processors 102 and 104 may each comprise any suitable processor architecture and for one embodiment comprise an Intel® Architecture used, for example, in the Pentium® family of processors available from Intel® Corporation of Santa Clara, Calif. Computer system 100 for other embodiments may comprise one, three, or more processors any of which may execute a set of instructions that are in accordance with embodiments of the present invention.

Chipset 120 for one embodiment comprises memory controller hub (MCH) 130, input/output (I/O) controller hub (ICH) 140, and firmware hub (FWH) 170. MCH 130, ICH 140, and FWH 170 may each comprise any suitable circuitry and for one embodiment is each formed as a separate integrated circuit chip. Chipset 120 for other embodiments may comprise any suitable one or more integrated circuit devices.

MCH 130 may comprise any suitable interface controllers to provide for any suitable communication link to processor bus 110 and/or to any suitable device or component in communication with MCH 130. MCH 130 for one embodiment provides suitable arbitration, buffering, and coherency management for each interface.

MCH 130 is coupled to processor bus 110 and provides an interface to processors 102 and 104 over processor bus 110. Processor 102 and/or processor 104 may alternatively be combined with MCH 130 to form a single chip. MCH 130 for one embodiment also provides an interface to a main memory 132 and a graphics controller 134 each coupled to MCH 130. Main memory 132 stores data and/or instructions, for example, for computer system 100 and may comprise any suitable memory, such as a dynamic random access memory (DRAM) for example. Graphics controller 134 controls the display of information on a suitable display 136, such as a cathode ray tube (CRT) or liquid crystal display (LCD) for example, coupled to graphics controller 134. MCH 130 for one embodiment interfaces with graphics controller 134 through an accelerated graphics port (AGP). Graphics controller 134 for one embodiment may alternatively be combined with MCH 130 to form a single chip.

MCH 130 is also coupled to ICH 140 to provide access to ICH 140 through a hub interface. ICH 140 provides an interface to I/O devices or peripheral components for computer system 100. ICH 140 may comprise any suitable interface controllers to provide for any suitable communication link to MCH 130 and/or to any suitable device or component in communication with ICH 140. ICH 140 for one embodiment provides suitable arbitration and buffering for each interface.

For one embodiment, ICH 140 provides an interface to one or more suitable integrated drive electronics (IDE) drives 142, such as a hard disk drive (HDD) or compact disc read only memory (CD ROM) drive for example, to store data and/or instructions for example, one or more suitable universal serial bus (USB) devices through one or more USB ports 144, an audio coder/decoder (codec) 146, and a modem codec 148. ICH 140 for one embodiment also provides an interface through a super I/O controller 150 to a keyboard 151, a mouse 152, one or more suitable devices, such as a printer for example, through one or more parallel ports 153, one or more suitable devices through one or more serial ports 154, and a floppy disk drive 155. ICH 140 for one embodiment further provides an interface to one or more suitable peripheral component interconnect (PCI) devices coupled to ICH 140 through one or more PCI slots 162 on a PCI bus and an interface to one or more suitable industry standard architecture (ISA) devices coupled to ICH 140 by the PCI bus through an ISA bridge 164. ISA bridge 164 interfaces with one or more ISA devices through one or more ISA slots 166 on an ISA bus.

ICH 140 is also coupled to FWH 170 to provide an interface to FWH 170. FWH 170 may comprise any suitable interface controller to provide for any suitable communication link to ICH 140. FWH 170 for one embodiment may share at least a portion of the interface between ICH 140 and super I/O controller 150. FWH 170 comprises a basic input/output system (BIOS) memory 172 to store suitable system and/or video BIOS software. BIOS memory 172 may comprise any suitable non-volatile memory, such as a flash memory for example.

Accordingly, computer system 100 includes a machine-readable medium on which is stored a set of instructions (i.e., software) embodying any one, or all, of the methodologies described herein. For example, software can reside, completely or at least partially, within main memory 132 and/or within processors 102/104. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Figure 2:
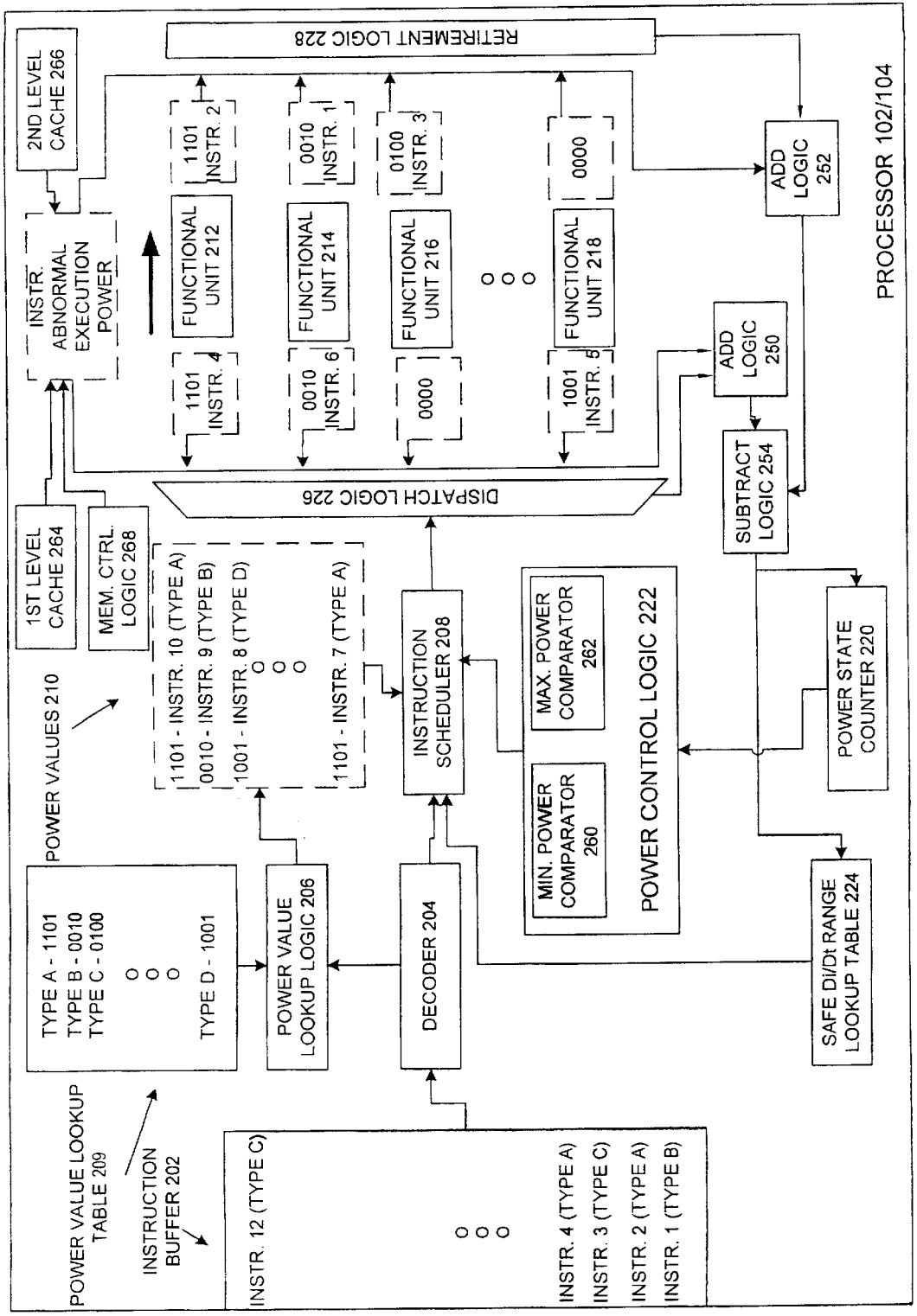
FIG. 2 illustrates a more detailed diagram of a processor, according to embodiments of the present invention.

FIG. 2 illustrates a more detailed diagram of a processor, according to embodiments of the present invention. In particular, FIG. 2 illustrates a more detailed diagram of one of processors 102/104 (hereinafter "processor 102").

Instruction buffer 202 is coupled to receive instructions, such as macro instructions, from a prefetcher (not shown). As illustrated, the instructions have an associated type, which is described in more detail below. For example, instruction 1 is of type B while instruction 3 is of type C.

Decoder 204 is coupled to instruction buffer 202, such that decoder 204 retrieves the instructions from instruction buffer 202. Decoder 204 can receive these macro instructions and decode these macro instructions to determine the given instruction and also to generate a number of micro operations for each macro instruction. For example, a multiply macro instruction may include a number of load and store micro operations as well as the multiply micro operation. Decoder 204 is also coupled to instruction scheduler 208, such that instruction scheduler 208 can receive these micro operations for scheduled execution by functional units 212–218.

Decoder 204 is coupled to power value lookup logic 206, wherein the type for a given instruction is transmitted from decoder 204 to power value lookup logic 206. In one embodiment, the power values stored in power value lookup logic 206 are programmable, such that these values can be updated subsequent to the manufacturing of processor 102. In another embodiment, the power values stored in power value lookup logic 206 are hardwired into processor 102.

Power value lookup logic 206 is coupled to power value lookup table 209. Power value lookup table 209 can be one of a number of different types of memory, such as different types of random access memory (RAM). Moreover, power value lookup table 209 can be any of a number of different data structures. Further, power value lookup table 209 is shown to be within processor 102. In other embodiments, power value lookup table 209 could be stored external to processor 102. As will be described in more detail below, power number lookup logic 206 determines a power value for a given instruction based on the received instruction type by performing a lookup into power value lookup table 209. For example, a type A instruction includes a power value of 1101; a type B instruction includes a power value of 0010; a type C instruction includes a power value of 0100; a type D instruction includes a power value of 1001, etc.

Power value lookup logic 206 is coupled to instruction scheduler 208, such that power value lookup logic 206 transmits power values 210 associated with the given instructions to instruction scheduler 208. Instruction scheduler 208 is also coupled to safe Di/Dt range lookup table 224, wherein instruction scheduler 208 can query safe Di/Dt range lookup table 224 to determine the safe range of a change in current over time to be drawn by processor 102. As will be described in more detail below, instruction scheduler 208 is able to schedule instructions for execution by functional units 212–218 such that an abrupt surge in current within a predetermined time period is precluded, based on a safe Di/Dt range received from safe Di/Dt range lookup table 224.

Instruction scheduler 208 is also coupled to power control logic 222, wherein power control logic 222 transmits signal(s) indicating whether the current power state of processor 102 is below a minimum threshold or above a maximum threshold for power consumption (as will be described in more detail below). Further, instruction scheduler 208 is coupled to dispatch logic 226, such that the instruction scheduler 208 transmits the instructions to be executed by functional units 212–218. Dispatch logic 226 is coupled to functional units 212–218 such that dispatch logic 226 transmits the instructions to functional units 212–218 for execution. Functional units 212–218 can be one of a number of different execution units, including, but not limited to, an integer arithmetic logic unit (ALU), a floating-point unit, memory load/store unit, etc. Functional units 212–218 are also coupled to retirement logic 228, such that functional units 212–218 execute the instructions and transmit the results to retirement logic 228. Retirement logic 228 can transmit these results to memory that can be internal or external to processor 102, such as registers in a register file (internal to processor 102) or main memory 132 (external to processor 102).

Additionally as shown, dispatch logic 226 is coupled to add logic 250, such that when a given instruction is dispatched for execution to a given functional unit 212–218, dispatch logic 226 transmits the power value for this instruction to add logic 250. Add logic 250 adds this power value to the other power values for the other instructions that have been transmitted to functional units 212–218 for execution. Accordingly, add logic 250 totals the power values for each instruction to be executed and are currently being executed by functional units 212–218.

Retirement logic 228 is also coupled to add logic 252, such that when a given functional unit has completed execution of a given instruction, the power value for this instruction is transmitted to add logic 252. Add logic 252 add this power value to the other power values for the other instructions that have completed execution. Accordingly, add logic 252 totals the power values for each instruction that have completed execution.

Functional units 212–218 that access the different caches within processor 102 and other memory external to processor 102 for instruction execution can consume different levels of power depending on the location of the data. For example, a memory load instruction fetching the data from the first level cache can consume a first amount of power, while a memory load instruction fetching the data from the second level cache can consume a second amount of power, while a memory load instruction fetching data from memory external to processor 102, such as main memory 132 can consume a third amount of power. Accordingly, first level cache 264, second level cache 266 and memory control logic 268 are coupled to add logic 250 and add logic 252. Memory control logic 268 is coupled memory external to processor 102 to enable the loading and storing of data into such memory from processor 102. Therefore, when one of functional units 212–218 retrieves data from these caches or memory, the power values for these retrievals are added to add logic 250 and add logic 252 (during execution and upon completion of execution, respectively) to account for the additional power consumption associated with these retrievals Both add logic 250 and add logic 252 are coupled to subtract logic 254, such that the accumulation total for the power values for the instructions that have completed execution are subtracted from the accumulation total for the power values for instructions to be executed, thereby generating an output value from subtract logic 254 that indicates how much power is currently being or is scheduled to be consumed by the pending instructions. Subtract logic 254 is coupled to power state counter 220, such that this output value is stored in power state counter 220. In an embodiment, this value stored in power state counter 220 is updated after each instruction cycle within processor 102.

Power state counter 220 is coupled to power control logic 222, wherein the value of stored in power state counter 220 is retrieved by power control logic 222. In an embodiment, power control logic 222 includes minimum power comparator 260 and maximum power comparator 262. In operation, minimum power comparator 260 can receive the value stored in power state counter 220 and can compare that value to a minimum power value associated with the operation of processor 102. As will be described in more detail below, the results of this comparison can be transmitted to instruction scheduler 208 (to be employed in the scheduling of instructions). Further, maximum power comparator 262 can receive the value stored in power state counter 220 and can compare that value to a maximum power value associated with operation of processor 102. As will be described in more detail below, the results of this comparison can be transmitted to instruction scheduler 208 (to be employed in the scheduling of instructions).

With regard to the power values associated with the different instructions and which are stored in power value lookup table 209, a number of different embodiments can be employed for the determination of these power values. In one embodiment, a test application could be generated and executed by processor 102, wherein the test application causes the execution of a single instruction. Additionally, power measurement equipment can be coupled to processor 102 to measure the power consumed for this given instruction. Accordingly, the power can be determined for each instruction within instruction set architectures to be executing on processor 102. In another embodiment, low-level circuit simulations could be conducted to determined power consumed with processor 102 for a given instruction. Moreover, these power numbers can be periodically calibrated (and updated if necessary). For example, a current meter along with a set of micro-code or firmware can be incorporated into processor 102 such that a number of instructions can be executed wherein the current meter is read to determine if the expected power is being consumed by these set of instructions. Accordingly, the power values stored within processor 102 can be updated if the measured power being consumed by these instructions is different power values stored for these instructions.

Figure 3:
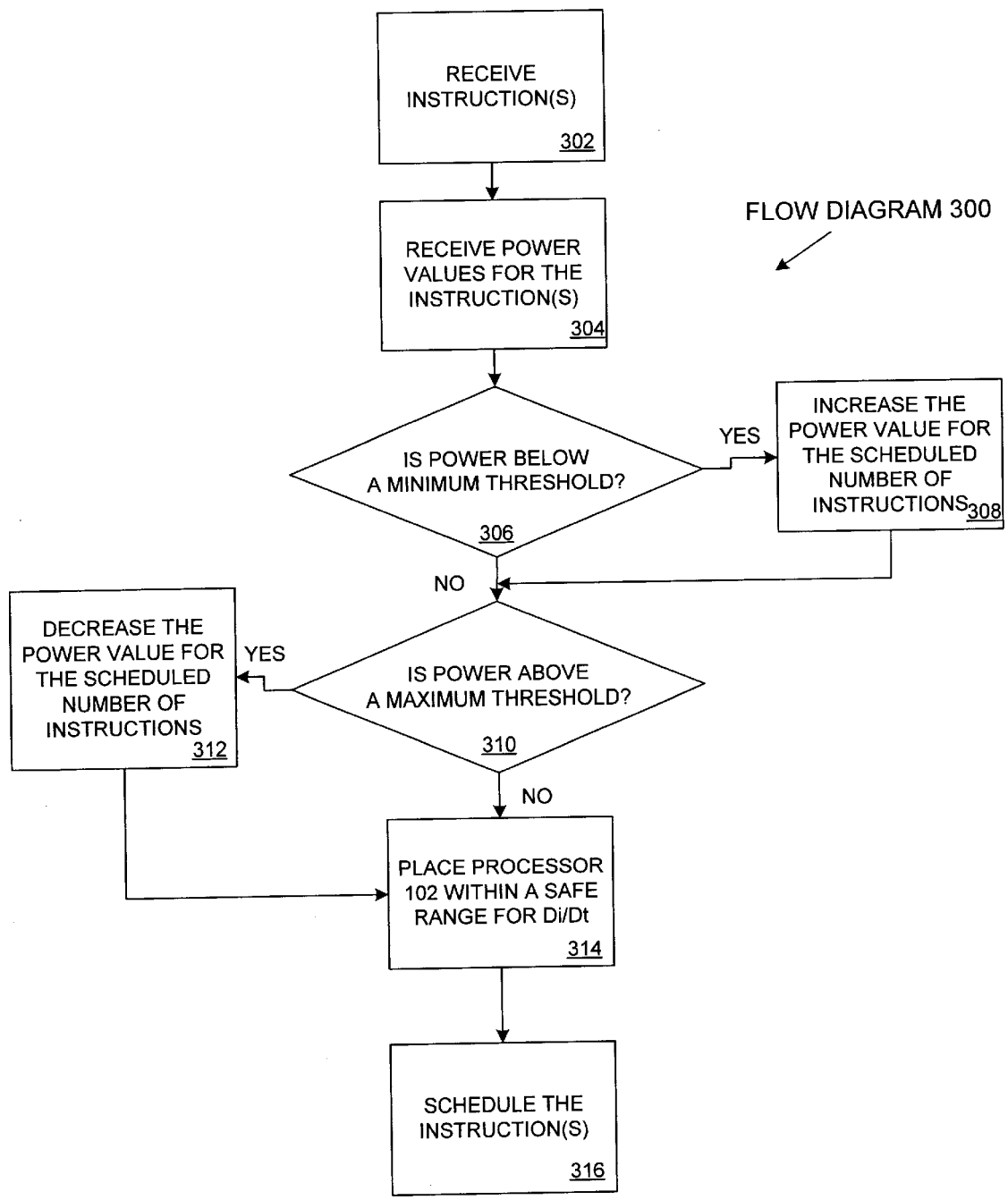
FIG. 3 illustrates a flow diagram of instruction scheduling, according to embodiments of the present invention.

The operation of processor 102 will now be described in more detail in conjunction with the flow diagram of FIG. 3. In particular, FIG. 3 illustrates a flow diagram of instruction scheduling, according to embodiments of the present invention. Flow diagram 300 commences with the receipt of instructions by instruction scheduler 208 from decoder 204, at process block 302. As shown in FIG. 2, a number of different instructions (e.g., macro instructions) are retrieved from instruction buffer 202 by decoder 204. In an embodiment, decoder 204 decodes these instructions into a number of different micro instructions or operations and transmits these micro operations to instruction scheduler 208.

Additionally, instruction scheduler 208 receives the power value for these instructions from power value lookup logic 206, at process block 304. In an embodiment, each instruction is of a given type. By way of example and not by way of limitation, FIG. 2 illustrates a number of different instructions that are categorized into type A, B, C or D. In other embodiments, the number of categories can be lesser or greater than that shown in FIG. 2. In one embodiment, this categorization is based on the op-code for the instruction. For example, an intensive floating point instruction, such as a transcendental operation, would be of type A, while a simple integer instruction, such as an add operation, would be of type D. Further a load/store instruction could be of type C.

Power value lookup logic 206 receives the instruction type from decoder 204 and retrieves the power value for these instructions from power value lookup table 208. In an embodiment, power value lookup logic 206 retrieves the power value for a given instruction based on the operation code (op-code) of the instruction. For example, one op-code could include an integer add operation while a different op-code could include a floating point multiplication operation. However, embodiments of the present invention are not so limited. For example, in another embodiment, a type could assigned by and appended to each instruction by other logic, thereby allowing instruction scheduler 208 to receive power values, independent of power value lookup logic 206 and/or power value lookup table 208. For example, in an alternative embodiment, decoding logic can be employed to determine the power value for a given instruction (instead of the power value lookup logic and lookup table shown in FIG. 2).

With regard to the assignment of a power value for a given instruction, in one embodiment, inter-instructional dependencies are taken into account to determine a power value for a given instruction. For example, if the power-per-instruction of executing one floating point instruction per clock is different than the power-per-instruction of executing two floating point instructions per clock, dispatch logic 226 may assign a different power value to the incoming floating point instruction based on the number of floating point instructions in the execution group. For example, dispatch logic 226 could modify the power value retrieved from power value lookup table 208 based on a given instruction having inter-instructional dependencies. Accordingly, instruction scheduler 208 receives the power values for the instructions, at process block 304.

Further, instruction scheduler 208 determines whether the power being consumed by processor 102 will fall below a predetermined minimum power threshold based on the currently scheduled instructions to be executed in a next instruction cycle, at process decision block 306. In particular, power state counter 220 stores a value representing the amount of power currently being consumed through the execution of instructions by functional units 212–218 and retrieval of data from caches 264 and 266 or other memory. The updating of this value will be described in more detail below. Power state counter 220 is coupled to power control logic 222. Power control logic 222 stores a predetermined minimum threshold value (not shown) for the amount of power to be consumed by processor 102. Additionally, power control logic 222 includes minimum comparator 260 that outputs a difference between the value stored in power state counter 220 and the predetermined minimum threshold value. Instruction scheduler 208 receives this difference. If the power to be consumed by the instructions scheduled to be executed in the next instruction cycle in addition to the current power being consumed by processor 102 is greater than the predetermined minimum threshold value, instruction scheduler 208 continues processing, at process decision block 310 (which is described in more detail below).

In contrast, if the power to be consumed by the instructions scheduled to be executed in the next instruction cycle in addition to the current power being consumed by processor 102 is not greater than the predetermined minimum threshold value, instruction scheduler 208 increases the power value for the instructions to be executed in the next instruction cycle, at process block 308. In one embodiment, instruction scheduler 208 increases this power value by increasing the number of instructions to be executed in the next instruction cycle. In one embodiment, instruction scheduler 208 can increase the number of instructions to be executed by scheduling instructions, which were scheduled to be executed in instruction cycles subsequent to the next instruction cycle, in the next instruction cycle. For example, if three instructions were scheduled to be executed by functional units 212–218 in instruction cycle 10 and four instructions (which were not dependent on the three instructions in instruction cycle 10) were scheduled to be executed by functional units 212–218 in instruction cycle 11 and if the power to be consumed in instruction cycle 10 were to fall below the predetermined minimum threshold value, instruction scheduler 208 could schedule one of the four instructions (from instruction cycle 11) to be executed in instruction cycle 10.

In an embodiment, instruction scheduler 208 can increase the number of instructions to be executed by scheduling artificial instructions. In other words, instruction scheduler 208 can schedule instructions that have not been requested and inserted into instruction buffer 202, thereby maintaining the required power consumption for processor 102.

Further in an embodiment, (if the power is not below a minimum power threshold) instruction scheduler 208 determines whether the power being consumed by processor 102 will be above a predetermined maximum threshold based on the currently scheduled instructions to be executed in a next instruction cycle, at process decision block 310. As described above, power state counter 220 stores a value representing the amount of power currently being consumed through the execution of instructions by functional units 212–218 and retrieval of data from caches 264 and 266 or other memory. Power state counter 220 is coupled to power control logic 222. Power control logic 222 stores a predetermined maximum threshold value (not shown) for the amount of power to be consumed by processor 102. Additionally, power control logic 222 includes maximum comparator 262 that outputs a difference between the value stored in power state counter 220 and the predetermined maximum threshold value. Instruction scheduler 208 receives this difference.

If the power to be consumed by the instructions scheduled to be executed in the next instruction cycle is less than this difference outputted from maximum comparator 262, instruction scheduler 208 continues processing, at process block 314 (which is described in more detail below). Conversely, if the power to be consumed by the instructions scheduled to be executed in the next instruction cycle is greater than this difference outputted from maximum comparator 262, instruction scheduler 208 decreases the power value for the scheduled number of instructions for the next instruction cycle, at process block 312.

In one embodiment, instruction scheduler 208 decreases the power value for the scheduled number of instructions for the next instruction cycle by reducing the number of instructions scheduled to be executed in this next instruction cycle. For example, if instruction scheduler 208 schedules instructions A, B and C for execution, but determines that with the introduction of the power values for these instructions that the total power would exceed the maximum power threshold, instruction scheduler 208 can look at the power values for each of instructions A, B and C. Accordingly, if the removal of instructions B or C would reduce the total power below the maximum power threshold, while the removal of instruction A would not, instruction scheduler 208 could remove either instruction B or C from the schedule for the next instruction cycle (having such instruction execute in a subsequent instruction cycle).

In an embodiment, instruction scheduler 208 decreases the power value for the scheduled number of instructions for the next instruction cycle by exchanging instructions to be executed in the next instruction cycle with instructions scheduled for execution in instruction cycles subsequent to the next instruction cycle. For example, assume that instruction scheduler 208 schedules instructions A, B and C for execution in instruction cycle 15 and schedules instructions D, E and F for execution in instruction cycle 16. If instruction scheduler 208 determines that with the introduction of the power values for instructions A, B and C that the total power would exceed the maximum power threshold, instruction scheduler 208 could look to replace at least one of instructions A, B or C with at least one of instructions D, E or F. For example, if instruction scheduler 208 determines that the combination of A, E and F would enable the total power for processor 102 to be below the maximum power threshold and that instructions E and F can be executed in conjunction with instruction A and prior to the execution of instructions B and C, instruction scheduler 208 can schedule instructions A, E and F for instruction cycle 15 and can schedule instructions B, C and D for instruction cycle 16.

Figure 4:
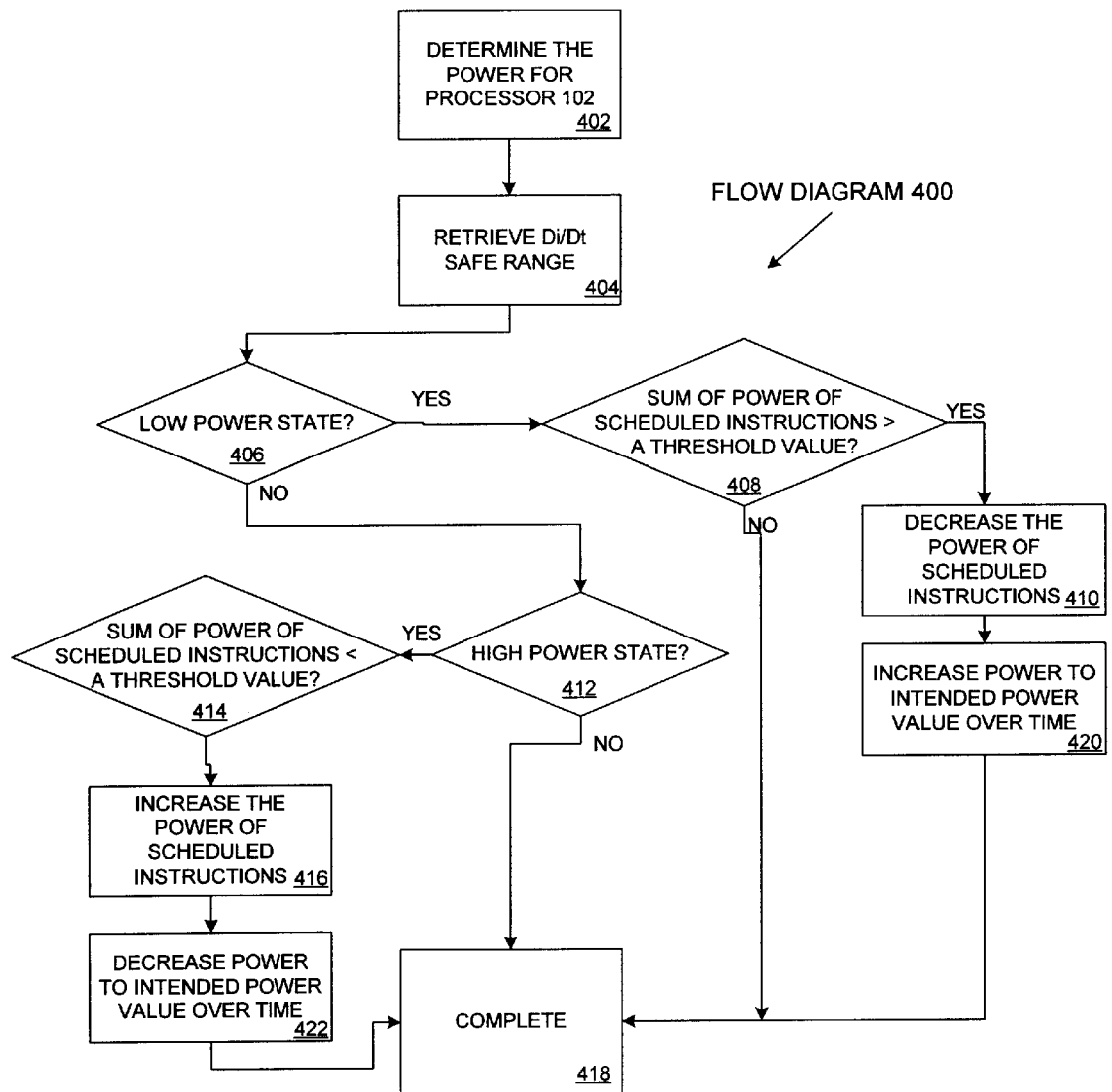
FIG. 4 illustrates a flow diagram for placing a processor within a safe range for Di/Dt through instruction scheduling, according to embodiments of the present invention.

Further in an embodiment (whether power is below a maximum power threshold or not), instruction scheduler 208 places processor 102 within a safe range for Di/Dt, which is described in more detail below in conjunction with the flow diagram of FIG. 4, at process block 314. Instruction scheduler 208 schedules and transmits the instructions to be executed in the next instruction cycle to dispatch logic 226, wherein these instructions will be dispatched to one of the appropriate functional units 212–218, at process block 316.

The placement of processor 102 into a safe range for Di/Dt will now be described. In particular, FIG. 4 illustrates a flow diagram for placing a processor within a safe range for Di/Dt through instruction scheduling, according to embodiments of the present invention. Flow diagram 400 commences with the determining, by instruction scheduler 208, of the power state for processor 102, at process block 402. In particular, instruction scheduler 208 retrieves the power value from power state counter 220 (which indicates the power currently being consumed by processor 102 for instruction execution). Based on this value, instruction scheduler 208 determines what state or level processor 102 is within. In one embodiment, processor 102 can be in a low power state or a high power state. In one such embodiment, processor 102 is within a low power state if the power is below a low power state threshold value (a current change threshold value) and is within a high power state if the power is above a high power state threshold value (a current change threshold value).

Instruction scheduler 208 retrieves a Di/Dt safe range for the power being consumed by processor 102, at process block 404. In one embodiment, instruction scheduler 208 determines the low power state threshold value (the current change threshold value) and the high power threshold value (the current change threshold value) by retrieving this Di/Dt safe range for processor 102 from safe Di/Dt range lookup table 224. In one such embodiment, this Di/Dt safe range can be a single value that indicates the amount of allowable change in current over time.

For example, if processor 102 had a current power value (stored in power state counter 220) of 'X' and a Di/Dt safe range of 'Y', the low power state threshold value could be 'X−Y', while the high power state threshold value could be 'X+Y'. Therefore the Di/Dt safe range for processor 102 having a current power consumption of 'X' would be between 'X−Y' and 'X+Y'.

Instruction scheduler 208 determines whether processor 102 is within a low power state, at process decision block 406. Upon determining that processor 102 is within a low power state, instruction scheduler 208 determines whether the sum of the power values for the instruction that are scheduled to execute are greater than a predetermined threshold value, at process decision block 408. Upon determining that the sum of the powers for the scheduled instructions are greater than the threshold value, instruction scheduler 208 decreases the power of the scheduled instructions, at process block 410.

Similar to when the maximum power threshold value has been exceeded, in one embodiment, instruction scheduler 208 decreases the power value for the scheduled number of instructions for the next instruction cycle by reducing the number of instructions scheduled to be executed in this next instruction cycle. For example, if instruction scheduler 208 schedules instructions A, B and C for execution, but determines that with the introduction of the power values for these instructions that the total power would exceed this threshold value, instruction scheduler 208 can look at the power values for each of instructions A, B and C. Accordingly, if the removal of instructions B or C would reduce the total power below this threshold value, while the removal of instruction A would not, instruction scheduler 208 could remove either instruction B or C from the schedule for the next instruction cycle (having such instruction execute in a subsequent instruction cycle).

In an embodiment, instruction scheduler 208 decreases the power value for the scheduled number of instructions for the next instruction cycle by exchanging instructions to be executed in the next instruction cycle with instructions scheduled for execution in instruction cycles subsequent to the next instruction cycle. For example, assume that instruction scheduler 208 schedules instructions A, B and C for execution in instruction cycle 15 and schedules instructions D, E and F for execution in instruction cycle 16. If instruction scheduler 208 determines that with the introduction of the power values for instructions A, B and C that the total power would exceed this threshold value, instruction scheduler 208 could look to replace at least one of instructions A, B or C with at least one of instructions D, E or F. For example, if instruction scheduler 208 determines that the combination of A, E and F would enable the total power for processor 102 to be below this threshold value and that instructions E and F can be executed in conjunction with instruction A and prior to the execution of instructions B and C, instruction scheduler 208 can schedule instructions A, E and F for instruction cycle 15 and can schedule instructions B, C and D for instruction cycle 16.

Returning to FIG. 4, instruction scheduler 208 increases the power for the scheduled instructions over time to the intended power value, at process block 420. In particular, the intended power value is that value that includes the power being consumed as well as the power to be consumed (by the intended scheduled instructions). To help illustrate, assume that the current power being consumed is X, while the power to be consumed by the intended scheduled instructions was Y. Accordingly, the intended power value equals X+Y. Assuming that the power value equaling X+Y would cause the Di/Dt threshold to be exceeded (because of too much of an increase in current over time), instruction scheduler 208 could gradually increase the power consumption from X to X+Y by scheduling instructions to cause this gradually change over time. For example, if a power value of X involved one instruction per 20 clock cycles and a power value of X+Y involved 20 instructions per 20 clock cycles, instructions scheduler 208 could increase the number of instructions over time (such as five instructions per 20 clock cycles, followed by 10 instructions per 20 clock cycles, followed by 15 instructions per 20 clock cycles and followed by 20 instructions per 20 clock cycles).

Upon determining that the sum of the powers for the scheduled instructions are not greater than the threshold value, instruction scheduler 208 has completed the placing of processor 102 within a safe range of Di/Dt, at process block 418. Upon determining that processor 102 is not within a low power state, instruction scheduler 208 determines whether processor 102 is within a high power state, at process decision block 412.

Upon determining that processor 102 is within a high power state, instruction scheduler 208 determines whether the sum of the power values for the instruction that are scheduled to execute are less than a predetermined threshold value, at process decision block 414. Upon determining that the sum of the powers for the scheduled instructions is less than the threshold value, instruction scheduler 208 increases the power of the scheduled instructions, at process block 416.

Similar to when the minimum power threshold value has not been exceeded, in one embodiment, instruction scheduler 208 increases this power value by increasing the number of instructions to be executed in the next instruction cycle. In one embodiment, instruction scheduler 208 can increase the number of instructions to be executed by scheduling instructions, which were scheduled to be executed in instruction cycles subsequent to the next instruction cycle, in the next instruction cycle. For example, if three instructions were scheduled to be executed by functional units 212–218 in instruction cycle 10 and four instructions (which were not dependent on the three instructions in instruction cycle 10) were scheduled to be executed by functional units 212–218 in instruction cycle 11 and if the power to be consumed in instruction cycle 10 were to fall below this threshold value, instruction scheduler 208 could schedule one of the four instructions (from instruction cycle 11) to be executed in instruction cycle 10.

In an embodiment, instruction scheduler 208 can increase the number of instructions to be executed by scheduling artificial instructions. In other words, instruction scheduler 208 can schedule instructions that have not been requested and inserted into instruction buffer 202, thereby maintaining the required power consumption for processor 102.

Returning to FIG. 4, instruction scheduler 208 decreases the power for the scheduled instructions over time to the intended power value, at process block 422. In particular, the intended power value is that value that includes the power being consumed as well as the power to be consumed (by the intended scheduled instructions). To help illustrate, assume that the current power being consumed is A, while the power to be consumed with the addition of the intended scheduled instructions was A–B. Accordingly, the intended power value equals A–B. Assuming that the power value equaling A–B would cause the Di/Dt threshold to be exceeded (because of too much of an increase in current over time), instruction scheduler 208 could gradually increase the power consumption from A to A–B by scheduling instructions to cause this gradually change over time. For example, if a power value of A involved 20 instruction per 20 clock cycles and a power value of A–B involved 5 instructions per 20 clock cycles, instructions scheduler 208 could decrease the number of instructions over time (such as 15 instructions per 20 clock cycles, followed by 10 instructions per 20 clock cycles and followed by five instructions per 20 clock cycles). Upon determining that the sum of the powers for the scheduled instructions are not greater than the threshold value, instruction scheduler 208 has completed the placing of processor 102 within a safe range of Di/Dt, at process block 418.

The placement of processor 102 within a safe range for the change in current over time illustrated by flow diagram 400 is by way of example and not by way of limitation. For example, in another embodiment, the safe range for the change in current over time could be compared against the current power consumption and the change in the current that will occur upon deploying the scheduled instructions. Accordingly, the power values for the scheduled instructions could be modified to ensure that processor 102 is within this safe range of current over time, independent of determining whether processor 102 is within a given state, such as a low power state or high power state.

Moreover, embodiments of the present invention have been described such that the electronic device is employing a number of different methods together. However, embodiments of the present invention are not so limited, as a number of the different methods can be incorporated separately into the electronic devices. For example, in one embodiment, an electronic device can schedule instructions based on the minimum and maximum power thresholds (shown in FIG. 3), while a different electronic device can schedule instructions based on the change in current being consumed by the electronic device over time (shown in FIG. 4).

As shown, embodiments of the present invention can be effective against power-virus applications that have little data dependency and large parallelism in software code that causes abnormally high power consumption compared to average applications. Moreover, embodiments of the present invention can allow for the design of microprocessors with a higher power specification, thus allowing for microprocessors with larger die size and higher frequencies.

Thus, a method and apparatus for instruction scheduling based on power estimation have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
    receiving a number of instructions for first and second instruction cycles;
    receiving a number of power values for the number of instructions indicating an amount of power required to execute the number of instructions by an electronic device;
    determining whether power being consumed by the electronic device during the first and second instruction cycles is within a range between a minimum power threshold and a maximum power threshold; and
    replacing at least one of the number of instructions for the first instruction cycle with at least one of the number of instructions for the second instruction cycle upon determining that the power being consumed by the electronic device during at least one of the first and second instruction cycles is not within the range between the minimum power threshold and the maximum power threshold.

2. The method of claim 1, further comprising increasing the number of instructions scheduled to be executed in at least one of the first and second instruction cycles upon determining that the power being consumed by the electronic device is below a minimum power threshold.

3. The method of claim 2, wherein increasing the number of instructions scheduled to be executed in the at least one of the first and second instruction cycles comprises adding a number of artificial instructions to be scheduled for execution in at least one of the first and second instruction cycles.

4. The method of claim 1, further comprising reducing the number of instructions scheduled to be executed in at least one of the first and second instruction cycles upon determining that the power being consumed by the electronic device is above a maximum power threshold.

5. The method of claim 1, further comprising determining whether a change in current over time being consumed by the electronic device is greater than a threshold value based on the power values of the number instructions scheduled for execution.

6. The method of claim 1, wherein the amount of power required to execute the number of instructions by the electronic device includes the amount of power required to execute the number of instructions by a number of functional units within the electronic device.

7. The method of claim 1, wherein the amount of power required to execute the number of instructions by the electronic device includes the amount of power required to retrieve data from a cache within the electronic device.

8. The method of claim 1, wherein the amount of power required to execute the number of instructions by the electronic device includes the amount of power required to retrieve data from a memory external to the electronic device.

9. A method comprising:
receiving a number of instructions for first and second instruction cycles;
receiving a number of power values for the number of instructions indicating an amount of power required to execute the number of instructions by a processor; and
scheduling the number of instructions for execution by the processor based on the number of power values, wherein the scheduling of the number of instructions comprises:
determining whether power being consumed by the processor is within a range between a minimum power threshold and a maximum power threshold;
determining whether a change in current over time being consumed by the processor is greater than a current change threshold value based on the power values of the number of instructions scheduled for execution; and
replacing at least one of the number of instructions for the first instruction cycle with at least one of the number of instructions for the second instruction cycle upon determining that the power being consumed by the processor during at least one of the first and second instruction cycles is not within the range between the minimum power threshold and the maximum power threshold and upon determining that the change in current over time being consumed by the processor is greater than the current change threshold value.

10. The method of claim 9, further comprising increasing the number of instructions scheduled to be executed in at least one of the first and second instruction cycles upon determining that the power being consumed by the electronic device is below a minimum power threshold.

11. The method of claim 10, wherein increasing the number of instructions scheduled to be executed in the at least one of the first and second instruction cycles comprises adding a number of artificial instructions to be scheduled for execution in at least one of the first and second instruction cycles.

12. The method of claim 11, further comprising reducing the number of instructions scheduled to be executed in at least one of the first and second instruction cycles upon determining that the power being consumed by the electronic device is above a maximum power threshold.

13. An apparatus comprising:
a memory to include a number of power values associated with a number of instructions for first and second instruction cycles, the number of power values indicating an amount of power required to execute the number of instructions by the apparatus; and
an instruction scheduler to receive the number of power values and the number of instructions, determine whether power being consumed by the apparatus is within a range between a minimum power threshold and a maximum power threshold based on the associated power values, and replace at least one of the number of instructions for the first instruction cycle with at least one of the number of instructions for the second instruction cycle upon determining that the power being consumed by the apparatus during at least one of the first and second instruction cycles is not within the range between the minimum power threshold and the maximum power threshold.

14. The apparatus of claim 13, further comprising a power value lookup logic coupled to the memory and the instruction scheduler, the power lookup logic to determine a power value for the number of instructions based on the at least one power value associated with the number of instructions.

15. The apparatus of claim 14, further comprising a decoder coupled to the power value lookup logic and the instruction scheduler, the decoder to retrieve the number of instructions from an instruction buffer and to transmit the number of instructions to the power value lookup logic.

16. The apparatus of claim 13, wherein the amount of power required to execute the number of instructions by the apparatus includes the amount of power required to retrieve data from a cache within the apparatus.

17. The apparatus of claim 13, wherein the amount of power required to execute the number of instructions by the apparatus includes the amount of power required to retrieve data from an external memory.

18. A system comprising:
a memory to include a number of instructions for first and second instruction cycles; and
a processor coupled to the memory, the processor comprising:
a number of functional units to execute the number of instructions;
a lookup table memory to include at least one power value associated with at least one of the number of instructions; and
an instruction scheduler to receive the at least one power value and the at least one of the number of instructions, the instruction scheduler to schedule the at least one of the number of instructions for execution by one of the number of functional units, determine whether power being consumed by the processor is within a range between a minimum power threshold and a maximum power threshold based on the at least one power value, and replace at least one of the number of instructions for the first instruction cycle with at least one of the number of instructions for the second instruction cycle upon determining that the power being consumed by the processor during at least one of the first and second instruction cycles is not within the range between the minimum power threshold and the maximum power threshold.

19. The system of claim 18, wherein the at least one power value indicates an amount of power required to execute the associated instruction.

20. The system of claim 19, wherein the processor further comprises a number of caches and the amount of power required to execute the associated instruction comprises an amount of power required to retrieve data from one of the number of caches.

21. The system of claim 19, wherein the amount of power required to execute the associated instruction comprises an amount of power required to retrieve data from the memory.

22. The system of claim 19, wherein the amount of power required to execute the associated instruction comprises the amount of power required to execute the associated instruction by one of the number of functional units.

23. A machine-readable medium that provides instruction, which when executed by a machine, cause said machine to perform operations comprising:

receiving a number of instructions for first and second instruction cycles;

receiving a number of power values for the number of instructions indicating an amount of power required to execute the number of instructions by an electronic device;

determining whether power being consumed by the electronic device during the first and second instruction cycles is within a range between a minimum power threshold and a maximum power threshold; and replacing at least one of the number of instructions for the first instruction cycle with at least one of the number of instructions for the second instruction cycle upon determining that the power being consumed by the electronic device during at least one of the first and second instruction cycles is not within the range between the minimum power threshold and the maximum power threshold.

24. The machine-readable medium of claim 23, wherein said operations performed further comprise increasing the number of instructions scheduled to be executed in at least one of the first and second instruction cycles upon determining that the power being consumed by the electronic device is below a minimum power threshold.

25. The machine-readable medium of claim 24, wherein said operations performed further comprise increasing the number of instructions scheduled to be executed in the at least one of the first and second instruction cycles comprises adding a number of artificial instructions to be scheduled for execution in at least one of the first and second instruction cycles.

26. The machine-readable medium of claim 23, wherein said operations performed further comprise reducing the number of instructions scheduled to be executed in at least one of the first and second instruction cycles upon determining that the power being consumed by the electronic device is above a maximum power threshold.

27. The machine-readable medium of claim 23, wherein said operations performed further comprise determining whether a change in current over time being consumed by the electronic device is greater than a threshold value based on the power values of the number instructions scheduled for execution.

28. The machine-readable medium of claim 23, wherein the amount of power required to execute the number of instructions by the electronic device includes the amount of power required to execute the number of instructions by a number of functional units within the electronic device.

29. The machine-readable medium of claim 23, wherein the amount of power required to execute the number of instructions by the electronic device includes the amount of power required to retrieve data from a cache within the electronic device.

30. The machine-readable medium of claim 23, wherein the amount of power required to execute the number of instructions by the electronic device includes the amount of power required to retrieve data from a memory external to the electronic device.

* * * * *